United States Patent [19]

Tanaka et al.

[11] Patent Number: 5,656,751
[45] Date of Patent: Aug. 12, 1997

[54] DICHROIC CRYSTAL

[75] Inventors: Hiromitsu Tanaka, Aichi-ken; Hisato Takeuchi, Chita; Arimitsu Usuki, Nagoya; Kazuo Tojima, Toyota; Atsushi Shirasawa, Toyota; Ai Kobayashi, Toyota, all of Japan

[73] Assignee: Kabushiki Kaisha Toyota Chuo Kenkyusho, Aichi-ken, Japan

[21] Appl. No.: 633,516

[22] Filed: Apr. 17, 1996

Related U.S. Application Data

[63] Continuation of Ser. No. 224,529, Apr. 7, 1994, abandoned.

[30] Foreign Application Priority Data

Apr. 7, 1993 [JP] Japan ................................. 5-080671

[51] Int. Cl.⁶ .................................................. C09B 47/04
[52] U.S. Cl. ............................ 540/128; 540/140; 540/141
[58] Field of Search ................................. 540/140, 141, 540/128

[56] References Cited

U.S. PATENT DOCUMENTS 5,350,843  9/1994  Itoh et al. .............................. 540/138
5,358,813  10/1994  Iijima et al. ............................. 430/59

FOREIGN PATENT DOCUMENTS 61-5121  2/1986  Japan .
3-262639  11/1991  Japan .

OTHER PUBLICATIONS

Sielcken et al., "Iodine Doped Phthalocyanines" (1990) J. Royal Neth. Chem. Soc., (109), 230–234.

Ogawa et al., "Phthalocyanine Derivative" (1989) Thin Solid Films, (178), 439–443.

Ichinose et al., "Liquid Crystal Phthalocyanines", (1991) Mol. Cryst. Lig. Cryst., (203), 25–31.

Schramm et al., "Properties of Iodine Phthalcyanines" (1980), J. Am.Chem. Soc., (102), 6702–6713.

Schock et al., "Conductive Oxidized Metallomacrocyles", (1979), J. Am. Chem. Soc., (101), 7071–7073.

Diel et al., "Cofacial Metallomacrocycles," (1983) J. Am Chem. Soc., (105), 1551–1567.

Dimrk et al., "Cofacial Metallmalocycles", (1983) J. Am Chem. Soc. (105), 1539–1550.

CA Registry No. 122532-10-9, First Three References Cited.

Sielcken et al., "Iodine–Doped Crowed Phthalocyanines", (1990) CA#113: 15610.

Ichinose et al., "LC Alignment w/ Phthalocyanide Devices", (1991) CA#115:124196.

*Primary Examiner*—Ralph H. Dean
*Attorney, Agent, or Firm*—Oblon, Spivak, McClelland, Maier & Neustadt, P.C.

[57] ABSTRACT

Disclosed is a dichroic crystal including at least one member selected from the group consisting of phtharocyanine, a phtharocyanine derivative, phtharocyanine with a central metal introduced therein, a phtharocyanine derivative with a central metal introduced therein, and iodine. It is precipitated when the iodine is added to a solution containing the member, and it includes the iodine in a form of $I_3^-$ and $I_5^-$ ions. It not only has a high dichroic property but also superb heat resistance and weatherability, so that it is applicable to suspended particles display devices used in severe environments.

15 Claims, 5 Drawing Sheets

"a"-AXIS DIRECTION

FIG. 4B

"b"-AXIS DIRECTION

FIG. 5

DICHROIC CRYSTAL

This application is a continuation of application Ser. No. 08/224,529, filed on Apr. 7, 1994, now abandoned.

BACKGROUND OF THE INVENTION

1. Field of the Invention

The present invention relates to a dichroic crystal which can exhibit a high dichroic property and which can be applied to a variety of electronics devices and optical devices, e.g., polarizing plates, liquid crystal display plates and suspended particles display (i.e., SPD) devices.

2. Description of Related Art

There has been a polarized film, one of the optical devices, which is made by absorbing a dichroic material, such as a dichroic pigment having a slender molecular structure or iodine, in a polymer matrix like polyvinyl alcohol (i.e., PVA) and followed by elongating the polymer matrix. The conventional dichroic materials exhibit a high dichroic ratio, but it is slightly poor in terms of heat resistance. As a result, electronics and optics engineers have longed for a dichroic pigment which can not only produce a high-grade dichroic property but also exhibit a high heat resistant.

Phthalocyanine is stable against light and heat, and is superior in fastness of color. Since it has conjugated pielectrons in its molecule, it has a large variety of interesting electronic and optical characteristics so that it has drawn attention as a material for electrophotographically sensitive substances, solar cells, optically recording devices.

However, it is less likely that phthalocyanine is used as a dichroic material. This results from the fact that it hardly forms a crystal in which all of the phthalocyanine molecules are aligned in parallel. For instance, in the case of copper phthalocyanine crystals, the alpha-crystal has the molecular plane inclining by 26.5 degrees, and the beta-crystal has the molecular plane inclining by 45.8 degrees. Hence, the molecules of the copper phthalocyanine have transition moments which are confined in the molecular planes. As a result, the copper phthalocyanine has a great dichroic property inherently, but its crystals exhibit a small dichroic property.

In order to use such phthalocyanine as a dichroic pigment, it is necessary to control the molecular alignment of the phthalocyanine molecules in crystals so as to effect the polarization. There have been several methods which can control the molecular alignment of phthalocyanine. For example, Japanese Unexamined Patent Publication (KOKAI) No. 3-262,639 sets forth one of the methods, and it discloses a process for preparing an LB film having a dichroic property by using phthalocyanine substituted with an alkyl group.

According to the Journal of American Chemical Society, 1980, volume 102, pages 6,702–6,713, Marks et al. disclose another method for controlling the molecular alignment of phthalocyanine. Namely, they synthesized nickel phthalocyanine iodide, and they examined the resulting single crystals for their structures by means of the X-ray diffraction microscopy and found out that the iodide crystals have a structure where iodine intrudes into the spaces between the columns of the laminated nickel phthalocyanine. As a result, it is believed that the crystalline structure of phthalocyanine can be modified by forming iodide complex.

However, phthalocyanine is generally obtained in a form of poly-crystalline particles. For instance, it is prepared in a form of aggregate in which micro-fine crystals having an average particle diameter of hundreds of angstroms are aggregated and whose molecular planes are aligned in different directions as a whole. As a result, when phthalocyanine being insoluble to a solvent is employed, the resulting phthalocyanine iodide is prepared in a form of polycrystalline particles. In the case where the phthalocyanine particles are used as the dichroic pigment, there arises the dichroic phenomenon only when the crystalline articles are single crystals having an average particle diameter of from a few micrometers to a few millimeters. In other words, only when such single crystals are employed therefor, the transmissivity of lights having a predetermined wavelength band can be changed considerably depending on the direction of the polarization planes of the lights with the single crystals. However, when the crystalline particles are poly-crystalline ones, the individual crystalline particles do not exhibit the dichroic property. Thus, it has been difficult to readily make the conventional phthalocyanines into crystalline particles each of which is capable of exhibiting the dichroic property.

SUMMARY OF THE INVENTION

The present invention has been developed in view of the circumstances described above. It is therefore an object of the present invention to make phthalocyanine or its derivatives, which are superb in terms of heat resistance and weatherability, into dichroic crystals which is applicable to a dichroic device.

The present invention has been completed based on the discovery by the present inventors. Namely, the present inventors diligently investigated how to make the complex compounds of the phthalocyanine or its derivatives having good heat resistance and weatherability and iodine, and the phthalocyanine or its derivatives with a central metal introduced therein and iodine, into dichroic crystals. As a result, they discovered that, when iodine is added to a solution dissolving the phthalocyanine or its derivatives, the precipitates result in crystals which exhibit a dichroic property. The phtharocyanine, its derivatives, and the phthalocyanine or its derivatives with a central metal introduced therein may be hereinafter collectively referred to as "phthalocyanines."

A dichroic crystal according to the present invention comprises: at least one member selected from the group consisting of phthalocyanine, a phthalocyanine derivative, phthalocyanine with a central metal introduced therein, a phthalocyanine derivative with a central metal introduced therein; and iodine. Further, the dichroic crystal is precipitated when the iodine is added to a solution containing the member, and it includes the iodine in a form of $I_3^-$ and $I_5^-$ ions.

The phthalocyanine derivative herein means a compound expressed with chemical formula (1) in which at least one group of the "x"-positions of the benzene rings of the phthalocyanine skeleton is substituted with either a substituent which includes at least one atom selected from the group consisting of nitrogen, oxygen, sulfur, halogen, silicon and phosphorous, or a substituent which is an alkyl group including a carbon chain having an unsaturated bond. The phthalocyanine derivative can be a compound in which the benzene rings are replaced by the other aromatic rings.

Chemical Formula (1)

Further, the central metal herein corresponds to the element "M" of chemical formula (2). The central metal can be one element selected from the group consisting of an alkali metal, an alkaline-earth metal, Al, Si, Ge, Sn, Pb, P, As, Sb, a transition metal, a lanthanide element and an actinide element. The alkali metal can be Na, K or the like. The alkaline-earth metal can be Mg, Be or the like. The transition metal can be Cr, Mn, Fe, V (or VO), Co, Ni, Cu, Zn, Ru, Rh, Os, Pt, Pd, Ag or the like. The lanthanide element can be La, Nd, Eu, Gd, Tb, Dy, Er, Tm, Yb or the like. The actinide element can be Ac, Th, Pa, U, Np, Pu, Am, Cm or the like. Further, these central metals can be coordinated with at least one ligand which is selected from the group consisting of $CN^-$, O, S, a halide ion and a compound having a lone electron-pair and capable of forming a paired ion. The compound having a lone electron-pair and capable of forming a paired ion can be pyridine, pyrazine or the like.

Chemical Formula (2)

Figure 5:
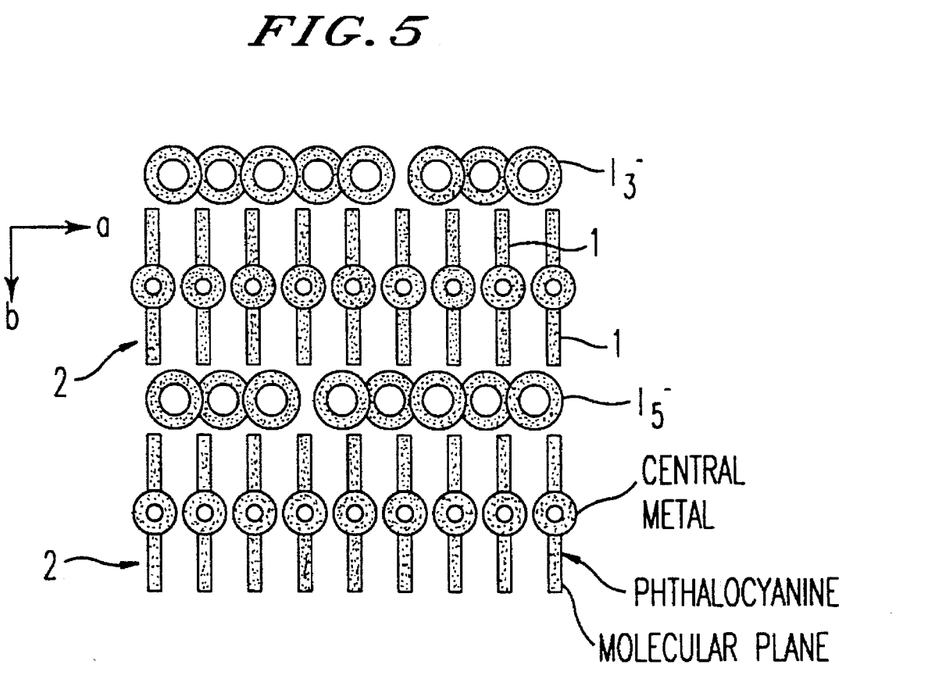
FIG. 5 is a schematic diagram for illustrating how the phthalocyanine molecules and the iodine ions are laminated in the Sixth Preferred Embodiment of the present dichroic crystal.

As schematically illustrated in FIG. 5, the present dichroic crystal has the following crystalline structure. For instance, the crystalline structure comprises columns 2 in which a plurality of the phthalocyanine molecules 1 are laminated in parallel, and iodine in the form of $I_3^-$ and $I_5^-$ ions which bond the columns 2. Hence, it is believed that the present dichroic crystal has been changed to a crystalline structure, which is different from that of the simple phthalocyanines, so as to make each of the crystalline particles into a single crystal, thereby producing the dichroic property.

For example, in the case of the phthalocyanine (i.e., one of the phthalocyanines), when the phthalocyanine is transformed into the iodide complex as described above, there arise the crystals in which the molecular planes of the phthalocyanine rings are aligned in parallel with each other. As a result, there arises a macro anisotropy in the transition moment of the phthalocyanine so that the present dichroic crystal exhibits the dichroic property. In addition, there arises a new absorption in the visible spectrum by a charge transfer between the phthalocyanine and the iodine species, e.g., the $I_3^-$ and $I_5^-$ ions. The absorption occurs when the molecules are disposed spatially in the crystal so as to make the transition moment anisotropic. Thus, the occurrence of the dichroic property means that there occurs the charge transfer. It is expected that the more likely the crystalline particles effect the charge transfer therein, the greater they exhibit the dichroic property.

In order to make the aforementioned crystalline structure, it is necessary to dissolve the phthalocyanines in a solvent. If such is the case, when iodine is added to the solution of the phthalocyanines, the charge transfer occurs between the iodine and the phthalocyanines, thereby forming the phthalocyanine crystals which contain the iodine in the form of the $I_3^-$ and $I_5^-$ ions therein. Accordingly, there are produced the crystals, as illustrated in FIG. 5, which are likely to exhibit the dichroic property. However, when the phthalocyanines are dissolved in a solvent to which they exhibit a low solubility, i.e., the iodide complex of the phthalocyanines are formed in a suspended state, the crystals are precipitated in an heterogeneous system. Consequently, it is impossible to produce the single crystal in which the molecular planes of the phthalocyanines are aligned in terms of the orientation.

As can be appreciated from the foregoing description, it is necessary to dissolve the phthalocyanines in an organic solvent in order to prepare the phthalocyanine iodides in which the molecular planes are aligned in terms of the orientation. In the phthalocyanines, however, the phthalocyanine rings superimpose to heavily attract each other. Accordingly, the phthalocyanines exhibit an extremely low solubility to solvent. In order to make the phthalocyanines soluble in solvent, the present invention employs the following arrangements: (1) the special metals capable of weakening the superimposition of the phthalocyanines are introduced in the phthalocyanines as the central metal; (2) at least one bulky substituent selected from the group consisting of an alkyl group, an alkoxy group, a sulfo group, an amino group and a carboxyl group is introduced in the benzene rings of the phthalocyanines in order to weaken the superimposition of the phthalocyanines; or (3) the phthalocyanine derivatives having both of the center metal and the bulky substituent are employed as the phthalocyanines. With these arrangements, the superimposition of the phthalocyanines is disturbed, and thereby the phthalocyanines undergo solvation. As a result, the phthalocyanines exhibit a high solubility to solvent. When the phthalocyanines are thus dissolved to form a homogeneous solution and iodine capable of ionizing is added thereto, it is possible to prepare the single crystal whose molecular planes are aligned.

For instance, when the unsubstituted phthalocyanines free from the substituent include the transition metal ion like $Ni^{+2}$ and $Cu^{2+}$ as the central metal, they are insoluble to solvent. On the other hand, when the phthalocyanines include the alkali metal ion such as $Na^+$ and $Li^+$, or the alkaline-earth metal ion such as $Mg^{2+}$ introduced therein as the central metal, they exhibit a high solubility to solvent. This results from the fact that the central metal is not confined within the ligand field of the phthalocyanine rings, and accordingly the metal sticks out of the phthalocyanine molecular planes so as to inhibit the phthalocyanine rings from superimposing. Likewise, it is possible to inhibit the phthalocyanine rings from superimposing in this manner even by peripherally substituting the phthalocyanine rings. An exemplification of the solubility enhancement of this type can be seen in the phthalocyanines, such as copper (II) tetra-t-butyl phthalocyanine and copper (II) octabutoxy phthalocyanine, in which both of the center metal and the bulky substituent are introduced.

In addition, when there exists a ligand which can axially coordinate with the central metal strongly, it is also possible to inhibit the phthalocyanine rings from superimposing, and thereby even unsubstituted phthalocyanines can be improved in terms of the solubility. Such phthalocyanines can be phthalocyanines in which Cr—F or Al—Cl is introduced as the central metal.

The aforementioned solvent capable of dissolving the phthalocyanines therein can be a highly polar donative solvent, such as dimethylformamide (DMF), dimethly sulfoxide (DMSO) and pyridine, for the phthalocyanines having Na, Li or Al as the central metal. In addition to the DMF, DMSO or the like, tetrachloroethane which is less polar than these solvents can be employed as the solvent for the substituted phthalocyanines such as copper (II) tetra-t-butyl phthalocyanine and copper (II) octabutoxy phthalocyanine.

When synthesizing the dichroic phthalocyanine iodide complex, it is preferred that the phthalocyanines exhibit a solubility of about 1 microgram/milliliter or more to the solvent, e.g., DMF, DMSO or the like.

The stability of the complex comprising the phthalocyanines and the halide depends on the electronegativity of the halide. Namely, when the halide comprises a halogen element whose atomic number is smaller and which exhibits a larger electronegativity, it produces a large stabilizing energy for forming the complex and reacts with the phthalocyanines to form a stable complex. However, the halogen element with a smaller atomic number has a stronger oxidizing power at the same time, and accordingly it more likely oxidizes the phthalocyanines. As a result, in addition to the decomposition of the phthalocyanines and the halide, the phthalocyanines and the halide react to decompose each other. The iodine is a halogen element which can balance off the electronegativity and the oxidizing power, and at the same time it more likely forms an inclusion complex when it takes the form of poly-iodine ion like the $I_3^-$ and $I_5^-$ ions. The latter characteristic of the iodine renders the iodine a preferable halogen element. Moreover, the poly-iodine $I_5^-$ ion is preferable over the poly-iodine $I_3^-$ ion because it produces a larger bonding area so as to advantageously generate the present dichroic crystal.

When producing the present dichroic crystal, it is possible to combine and use two or more of the phthalocyanines.

The complexes of the phthalocyanine iodide were examined for the thermal stability with a differential scanning calorimetry (i.e., DSC). It was found that the complexes of sodium phthalocyanine iodide, silver phthalocyanine iodide, lithium phthalocyanine iodide and magnesium phthalocyanine iodide were stable in a range of from room temperature to 300° C. because no endothermic and exothermic peaks which resulted from the dissociation of the iodine and the reaction between the phthalocyanine and the iodine. In the case of copper tetrabutoxy phthalocyanine iodide complex, a peak was observed at 258°C. This peak is believed to result from the fact that there occurred the dissociation of the iodine or the reaction between the phthalocyanine and the iodine. However, the copper tetrabutoxy phthalocyanine iodide complex was a stable crystal in a temperature range of less than 258°C. Therefore, the present dichroic crystal made from the complexes of the phthalocyanine iodides is thermally stable at elevated temperatures, and it is usefully applicable to the dichroic pigment.

The present dichroic crystal includes the phthalocyanines iodides in which iodine takes the form of $I_3^-$ and $I_5^-$ ions. Consequently, in the present dichroic crystal, the planes of the phthalocyanine molecules are aligned parallelly with each other so that there arises the macro anisotropy in the transition moment. As a result, there occurs the charge transfer between the phthalocyanines and the $I_3^-$ and $I_5^-$ ions so as to produce a new absorption in the visible spectrum. Thus, the present dichroic crystal exhibits a high dichroic property. In addition, the phthalocyanines have such good heat resistance and weatherability that the present dichroic crystal is applicable to suspended particles light control devices.

Namely, the present dichroic crystal can be used as a component of polarized films. Moreover, when it is made into fine particles and dispersed in a dielectric fluid, it can be used to construct the aforementioned suspended particles light control devices whose light transmissivity is varied by orientation control, e.g., by varying an electric field applied thereto. In particular, it can be used in severe environments, for example, it can be used for vehicles and outdoor displays, because the phthalocyanines constituting the present dichroic crystal are superb in terms of heat resistance and weatherability. In addition, when it is formed in particles in order to construct the polarized films, it is preferably formed in a needle-like configuration which has large configurational anisotropy. Similarly, when it is formed in particles in order to construct the suspended particles light control devices, it is preferably formed in a fibrous or needle-like configuration.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for purposes of illustration only and are not intended to limit the scope of the appended claims.

First Preferred Embodiment 100 mg of sodium phthalocyanine and 30 mg of iodine were dissolved in N, N-dimethylformamide. The mixture was stirred for 3 days. Thereafter, the mixture was heated at 140° C. for 2 minutes, and it was left as it was for a day. Then, the solvent, N, N-dimethylformamide, was distilled out under decompression. The residue was dried at 60° C. for 10 hours in vacuum, thereby preparing 100 mg of sodium phthalocyanine iodide crystals in a black powdered form.

The resulting crystals had a needle-like shape, and they were examined for the dichroic ratio and the transmissivity. For instance, the crystals were examined with a polarizing microscope to observe the minimum absorbance and the maximum absorbance. The thus observed minimum absorbance and the maximum absorbance were recorded with a CCD video camera. Then, the recorded images of the crystals were digitized with an image analyzer ("LA-555WS" made by PLAS Co., Ltd.) to evaluate the brightness at various points on the crystals. The dichroic ratio was calculated by dividing the maximum absorbance with the minimum absorbance. The results of this examination are set forth in Table 1 below. Moreover, the crystals were subjected to the Raman scattering spectroscopy, and they were found to exhibit the scattering peaks at 110 and 170 $cm^{-1}$ which resulted from the $I_3^-$ ion and the $I_5^-$ ion in the crystalline complexes respectively.

Second Preferred Embodiment 100 mg of lithium phthalocyanine and 30 mg of iodine were dissolved in N, N-dimethylformamide. The mixture was stirred for 3 days. Thereafter, the mixture was heated at 140° C. for 2 minutes, and it was left as it was for a day. Then, the solvent, N, N-dimethylformamide, was distilled out under decompression. The residue was dried at 60° C. for 10 hours in vacuum, thereby preparing 100 mg of lithium phthalocyanine iodide crystals in a black powdered form.

The resulting crystals had a needle-like shape, and they were similarly examined for the dichroic ratio and the transmissivity. They exhibited an average dichroic ratio of 6.9, a transmissivity of 69% at the minimum absorbance, and a transmissivity of 10% at the maximum absorbance. Table 1 below sets forth these results together with the other characteristics of the crystals examined. According to the Raman scattering spectroscopy conducted on the crystals, they were found to exhibit the scattering peaks at 110 and 170 $cm^{-1}$ which resulted from the $I_3^-$ ion and the $I_5^-$ ion in the crystalline complexes respectively.

Third Preferred Embodiment 100 mg of copper tetra-sodium sulfate phthalocyanine and 30 mg of iodine were dissolved in N, N-dimethylformamide. The mixture was stirred for 3 days. Thereafter, the mixture was heated at 140° C. for 2 minutes, and it was left as it was for a day. Then, the solvent, N, N-dimethylformamide, was distilled out under decompression. The residue was dried at 60° C. for 10 hours in vacuum, thereby preparing 100 mg of copper tetrasodium sulfate phthalocyanine iodide crystals in a black powdered form.

The resulting crystals had a needle-like shape, and they were similarly examined for the dichroic ratio and the transmissivity. They exhibited an average dichroic ratio of 6.7, a transmissivity of 92% at the minimum absorbance, and a transmissivity of 58% at the maximum absorbance. Table 1 below sets forth these results together with the other characteristics of the crystals examined. According to the Raman scattering spectroscopy conducted on the crystals, they were found to exhibit the scattering peaks at 110 and 170 $cm^{-1}$ which resulted from the $I_3^-$ ion and the $I_5^-$ ion in the crystalline complexes respectively.

Fourth Preferred Embodiment 100 mg of copper tetra-t-butyl phthalocyanine and 30 mg of iodine were dissolved in N, N-dimethylformamide. The mixture was stirred for 3 days. Thereafter, the mixture was heated at 140° C. for 2 minutes, and it was left as it was for a day. Then, the solvent, N, N-dimethylformamide, was distilled out under decompression. The residue was dried at 60° C. for 10 hours in vacuum, thereby preparing 100 mg of copper tetra-t-butyl phthalocyanine iodide crystals in a black powdered form.

The resulting crystals had a needle-like shape, and they were similarly examined for the dichroic ratio and the transmissivity. They exhibited an average dichroic ratio of 4.9, a transmissivity of 71% at the minimum absorbance, and a transmissivity of 21% at the maximum absorbance. Table 1 below sets forth these results together with the other characteristics of the crystals examined. According to the Raman scattering spectroscopy conducted on the crystals, they were found to exhibit the scattering peaks at 110 and 170 $cm^{-1}$ which resulted from the $I_3^-$ ion and the $I_5^-$ ion in the crystalline complexes respectively.

Fifth Preferred Embodiments

Likewise, another 8 dichroic crystals were synthesized from the 8 phthalocyanine derivatives set forth in Tables 2 and 3 below in the same manner as those of the First through Fourth Preferred Embodiments.

The resulting 8 crystals were similarly examined for the dichroic ratio, the transmissivity and the color. Tables 2 and 3 below sets forth the results of the examination on the 8 crystals. According to the Raman scattering spectroscopy conducted on the 8 crystals, all of them were found to exhibit the scattering peaks at 110 and 170 $cm^{-1}$ which resulted from the $I_3^-$ ion and the $I_5^-$ ion in the crystalline complexes respectively.

TABLE 1

| Characteristics | Identification | | | |
| --- | --- | --- | --- | --- |
| | 1st Pref. Embodiment | 2nd Pref. Embodiment | 3rd Pref. Embodiment | 4th Pref. Embodiment |
| Central Metal | Na | Li | Cu | Cu |
| Substituent | None | None | $SO_3Na$ | t-Bu |

TABLE 1-continued

| Characteristics | Identification | | | |
|---|---|---|---|---|
| | 1st Pref. Embodiment | 2nd Pref. Embodiment | 3rd Pref. Embodiment | 4th Pref. Embodiment |
| Transmissivity at Min. Absorbance | 0.72 | 0.69 | 0.92 | 0.71 |
| Transmissivity at Max. Absorbance | 0.21 | 0.10 | 0.58 | 0.20 |
| Dichroic Ratio for "R" Light | 7.68 | 6.91 | 7.54 | 4.44 |
| Dichroic Ratio for "G" Light | 4.83 | 5.25 | 8.64 | 5.32 |
| Dichroic Ratio for "B" Light | 3.95 | 8.50 | 3.87 | 5.01 |
| Color | Brown | Blue | Blue | Blue |

(Note) At Min. Absorbance: Bright State,
At Max. Absorbance: Dark State,
"R" Light: Red Light,
"G" Light: Green Light, and
"B" Light: Blue Light.

TABLE 2

| Characteristics | Identification | | | |
|---|---|---|---|---|
| | 5th Pref. Embodiment | 5th Pref. Embodiment | 5th Pref. Embodiment | 5th Pref. Embodiment |
| Central Metal | H | Mg | Si | Al-Cl |
| Substituent | BuO | None | None | None |
| Transmissivity at Min. Absorbance | 0.84 | 0.35 | 0.42 | 0.77 |
| Transmissivity at Max. Absorbance | 0.71 | 0.29 | 0.10 | 0.51 |
| Dichroic Ratio for "R" Light | 1.42 | 1.00 | 2.57 | 1.93 |
| Dichroic Ratio for "G" Light | 2.61 | 1.40 | 2.81 | 6.55 |
| Dichroic Ratio for "B" Light | 2.46 | 1.22 | 2.99 | 3.50 |
| Color | Brown | Blue | Blue | Blue |

(Note) At Min. Absorbance: Bright State,
At Max. Absorbance: Dark State,
"R" Light: Red Light,
"G" Light: Green Light, and
"B" Light: Blue Light.

TABLE 3

| Characteristics | Identification | | | |
|---|---|---|---|---|
| | 5th Pref. Embodiment | 5th Pref. Embodiment | 5th Pref. Embodiment | 5th Pref. Embodiment |
| Central Metal | Cr-F | Mn | Cu | Ag |
| Substituent | None | None | BuO | None |
| Transmissivity at Min. Absorbance | 0.65 | 0.47 | 0.64 | 0.69 |
| Transmissivity at Max. Absorbance | 0.33 | 0.19 | 0.17 | 0.23 |
| Dichroic Ratio for "R" Light | 2.46 | 2.27 | 3.76 | 3.99 |
| Dichroic Ratio for "G" Light | 2.76 | 2.16 | 4.33 | 4.58 |
| Dichroic Ratio for "B" Light | 2.75 | 3.29 | 4.75 | 3.59 |
| Color | Blue | Brown | Brown | Blue |

(Note) At Min. Absorbance: Bright State,
At Max. Absorbance: Dark State,
"R" Light: Red Light,
"G" Light: Green Light, and
"B" Light: Blue Light.

Figure 2:
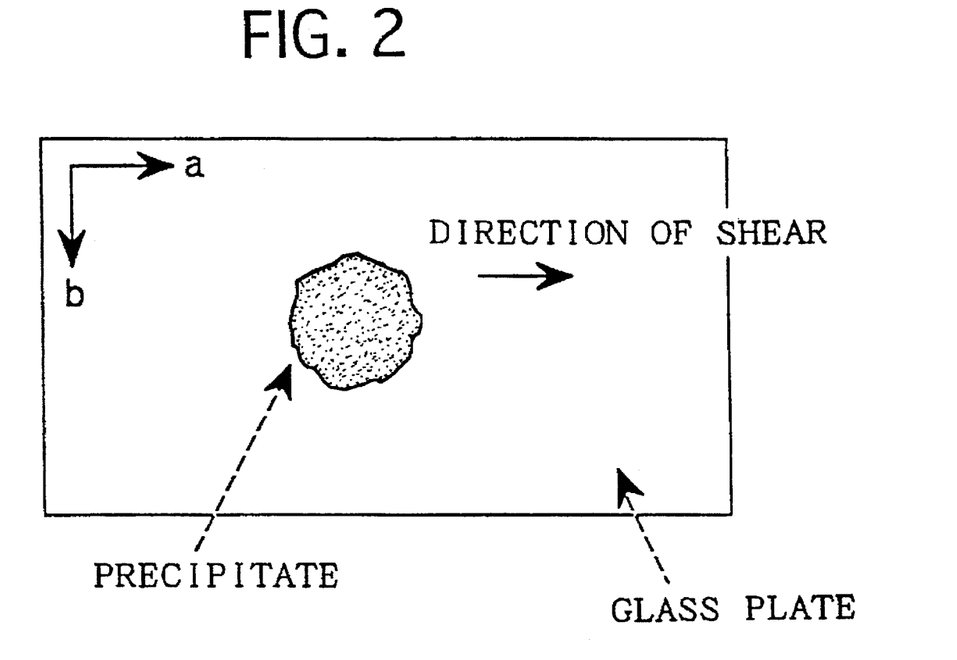
FIG. 2 is a schematic diagram for illustrating the direction of sear to which a polarized film, made from the Sixth Preferred Embodiment of the present dichroic crystal, was subjected during the preparation thereof.

Sixth Preferred Embodiment 100 mg of copper tetra-t-butyl, phthalocyanine and 30 mg of iodine were dissolved in N, N-dimethylformamide. The resulting precipitate was held between a pair of glass plates, and it was subjected to shear in one direction designated by "a" of FIG. 2. As a result, a film was prepared in which the resulting copper tetra-t-butyl phthalocyanine iodide was oriented in the direction of "a" of FIG. 2.

Figure 3:
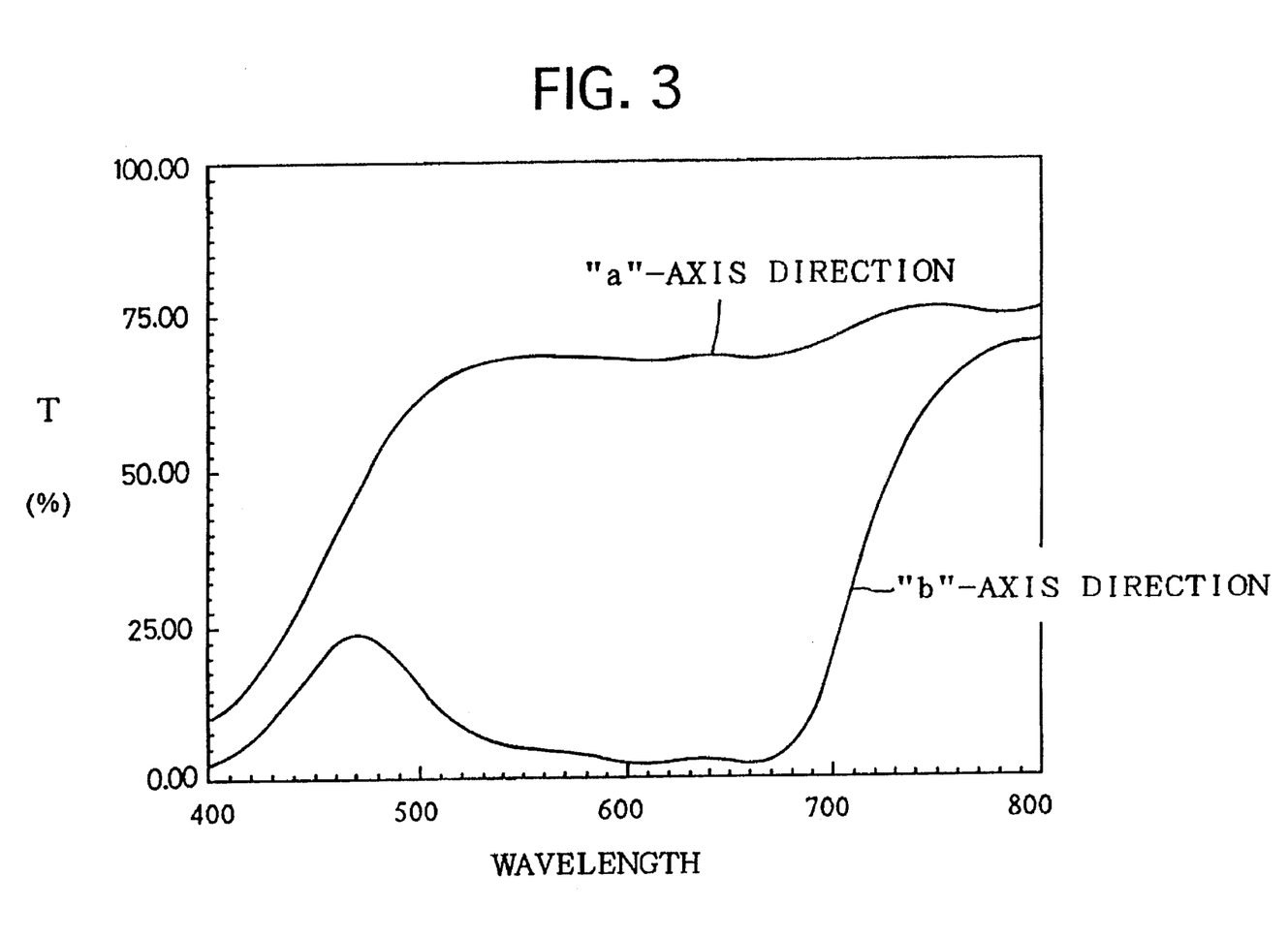
FIG. 3 illustrates a visible light absorption spectrum which was effected by the Sixth Preferred Embodiment of the present dichroic crystal in the directions of "a" and "b" axes thereof.
Figure 4A:
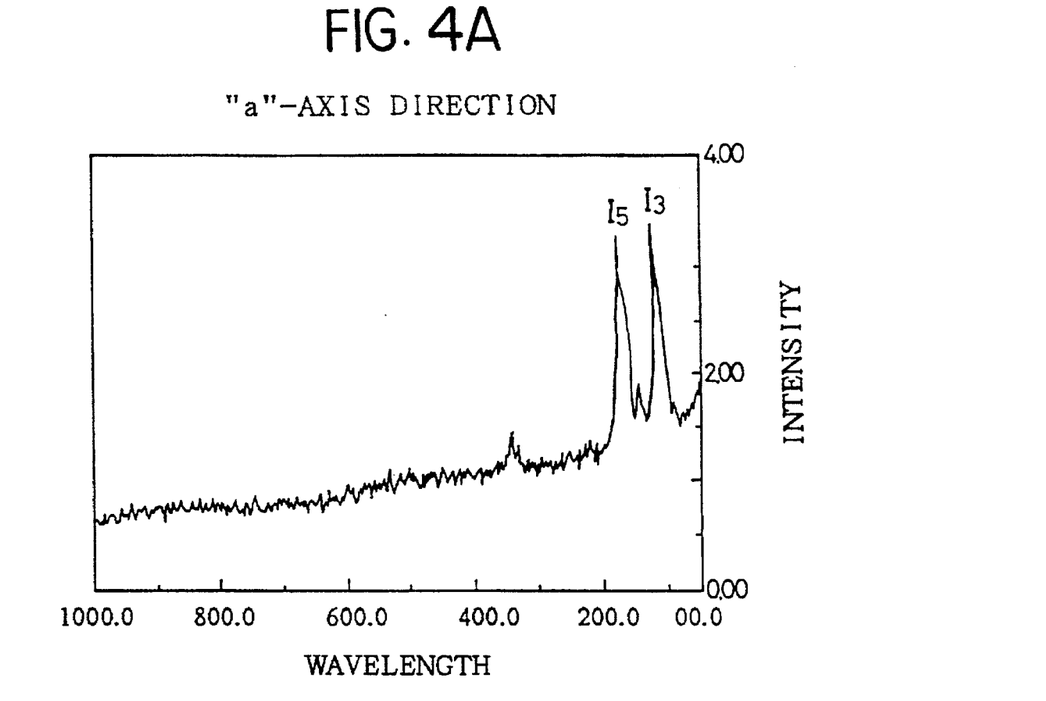
FIG. 4 (a and b) illustrates Raman spectra which were effected by the Sixth Preferred Embodiment of the present dichroic crystal in the directions of "a" and "b" axes thereof respectively.
Figure 4B:
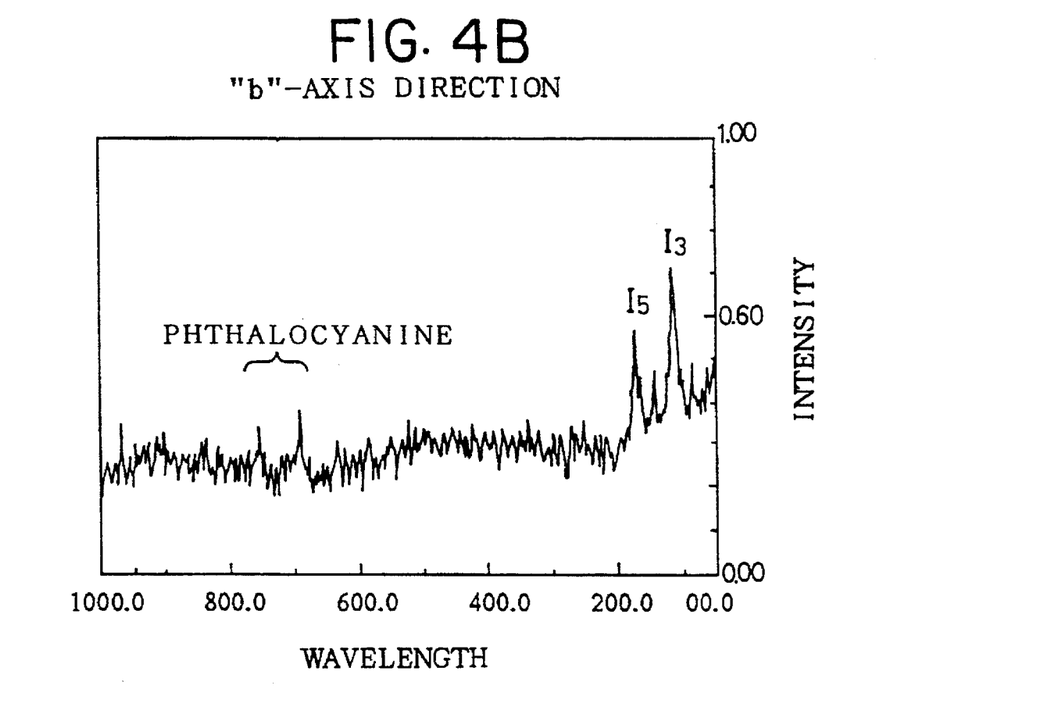

The film was observed by exposing it to a linear polarized light which had the plane of polarization perpendicularly and parallel to the shear direction. As a result, it exhibited a light yellowish color when it was exposed to the linear polarized light in parallel, and it exhibited a dark bluish color when it was exposed to the linear polarized perpendicularly. FIG. 3 illustrates the spectra of the transmitted light which the film exhibited during the parallel and perpendicular exposures. It exhibited high dichroic ratios of 3.7, 9.4 and 4.5 at 500 mm, 600 mm and 700 mm respectively. As can be seen from FIG. 4, it exhibited the scattering peaks of 110 and 170 $cm^{-1}$, which resulted from the $I_3^-$ ion and the $I_5^-$ ion in the crystalline complexes respectively, in both of the "a"-axis and "b"-axis directions. However, it exhibited the scattering peaks larger in the "a"-axis direction than it did in the "b"-axis direction.

Figure 1A:
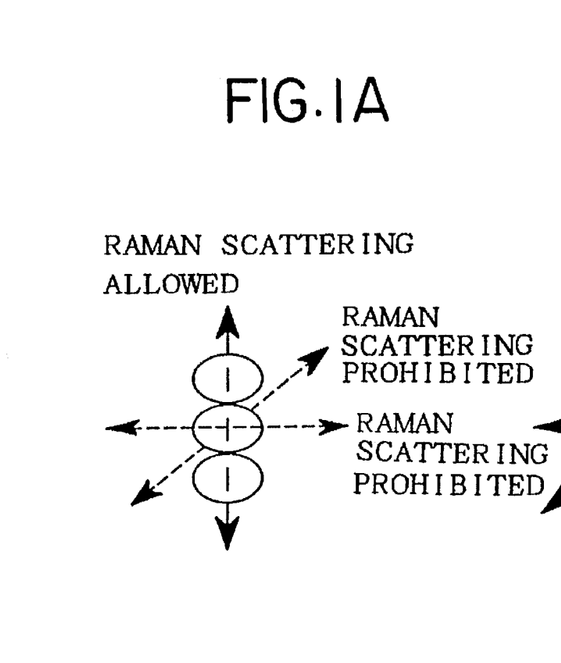
FIG. 1 (a, b, and c) is a schematic diagram for illustrating spectrum of the Raman scattering and the visible light anisotropy, wherein "a" illustrates the Raman scattering effected by the $I_3^-$ ion, "b" illustrates the Raman scattering effected by the $I_5^-$ ion, and "c" illustrates how phthalocyanine absorbs the visible light.
Figures 1B, 1C:
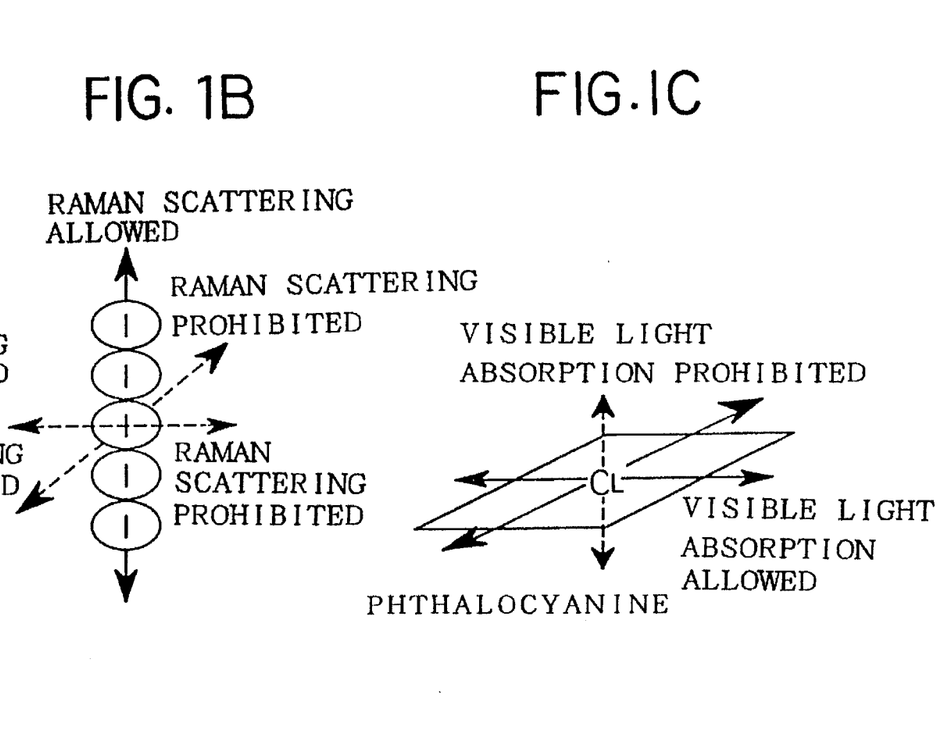

The phthalocyanine molecule exhibits an anisotropy in the absorbance of visible light, and accordingly it exhibits a large absorption constant in the direction of the molecular plane as illustrated in FIG. 1 (c). On the other hand, the poly-iodine ions exhibit a large anisotropy in terms of the scattering intensity of the Raman spectrum, and accordingly they exhibit a large scattering in the direction coinciding with the molecular axis as illustrated in FIG. 1 (a) and (b). Hence, it is possible to determine how molecules are oriented in the resulting phthalocyanines iodides by examining the anisotropies of the Raman spectrum and the visible light absorption spectrum.

Thus, in the present dichroic crystals, it was found that the molecular plane of phthalocyanine lies in the plane which is perpendicular to the "a"-axis of FIG. 5. Further, in the present dichroic crystals, it was also found that the iodine is present in the forms of $I_3^-$ and $I_5^-$ ions, and that the axes of both ions coincide with the "a"-axis. Furthermore, taken the three-dimensional packing requirement into account, it was determined that the present dichroic crystal has the construction as illustrated in FIG. 5.

Comparative Example No. 1

100 mg of nickel copper phthalocyanine and 30 mg of iodine were suspended in N, N-dimethylformamide. The suspension was stirred for 3 days. Thereafter, the suspension was heated at 140° C. for 2 minutes, and it was left as it was for a day. Then, the suspending agent, N, N-dimethylformamide, was distilled out under decompression. The residue was dried at 60° C. for 10 hours in vacuum, thereby preparing 100 mg of nickel copper phthalocyanine iodide crystals in a black powdered form.

The resulting crystals were examined with the polarizing microscope for the dichroic ratio, and they were found to exhibit no dichroic property. However, according to the Raman scattering spectroscopy conducted on the crystals, they were found to exhibit the scattering peaks which resulted from the $I_3^-$ ion.

In addition, the following phthalocyanines free from iodine were examined with the polarizing microscope for the dichroic ratio: sodium phthalocyanine, lithium phthalocyanine, copper tetra-sodium sulfate phthalocyanine and copper tetra-t-butyl phthalocyanine. They were found to exhibit no dichroic property. Tables 4 and 5 below summarize the results of the examination on the dichroic property and the transmissivity of Comparative Example No. 1 as well as the phthalocyanines free from iodine. As can be appreciated from Tables 4 and 5, all of Comparative Example No. 1 and the phthalocyanines free from iodine exhibited a dichroic ratio of 1.0 for red, green and blue lights, and they exhibited the identical transmissivity at the minimum absorbance and at the maximum absorbance respectively.

TABLE 4

| Characteristics | Identification | | |
|---|---|---|---|
| | Comp. Ex. 1 (e.g., nickel copper phthaocyanine iodide) | Sodium phthaocyanine | Lithium phthaocyanine |
| Dichroio Ratio for "R" Light | 1.0 | 1.0 | 1.0 |
| Dichroic Ratio for "G" Light | 1.0 | 1.0 | 1.0 |
| Dichroic Ratio for "B" Light | 1.0 | 1.0 | 1.0 |
| Transmissivity at Min. Absorbance | 0.2 | 0.2 | 0.1 |

TABLE 4-continued

| Characteristics | Identification | | |
|---|---|---|---|
| | Comp. Ex. 1 (e.g., nickel copper phthaocyanine iodide) | Sodium phthaocyanine | Lithium phthaocyanine |
| Transmissivity at Max. Absorbance | 0.2 | 0.2 | 0.1 |

(Note) At Min. Absorbance: Bright State,
At Max. Absorbance: Dark State,
"R" Light: Red Light,
"G" Light: Green Light, and
"B" Light: Blue Light.

TABLE 5

| Characteristics | Identification | |
|---|---|---|
| | Copper tetra-sodium sulfate phthaocyanine | Copper tetra-t-butyl phthaocyanine. |
| Dichroio Ratio for "R" Light | 1.0 | 1.0 |
| Dichroic Ratio for "G" Light | 1.0 | 1.0 |
| Dichroic Ratio for "B" Light | 1.0 | 1.0 |
| Transmissivity at Min. Absorbance | 0.4 | 0.2 |
| Transmissivity at Max. Absorbance | 0.4 | 0.2 |

(Note) At Min. Absorbance: Bright State,
At Max. Absorbance: Dark State,
"R" Light: Red Light,
"G" Light: Green Light, and
"B" Light: Blue Light.

Having now fully described the present invention, it will be apparent to one of ordinary skill in the art that many changes and modifications can be made thereto without departing from the spirit or scope of the present invention as set forth herein including the appended claims.

What is claimed is:

1. A dichroic single crystal, comprising:
   at least one member selected from the group consisting of a phthalocyanine, a phthalocyanine derivative, a phthalocyanine with a central metal introduced therein, a phthalocyanine derivative with a central metal introduced therein; and
   iodine;
   said dichroic single crystal being precipitated when said iodine is added to a solution containing said member, said member and said iodine forming a charge transfer complex containing both $I_3^-$ and $I_5^-$ ions; wherein said charge transfer complex comprises a plurality of columns of parallel laminated molecules of said member, and said $I_3^-$ and $I_5^-$ ions being bound to the columns and having a molecular axis disposed perpendicular to the molecular planes of the member.

2. The dichroic crystal according to claim 1, wherein said phthalocyanine derivative comprises a benzene ring which includes at least one substituent selected from the group consisting of a first substituent including at least one element selected from the group consisting of nitrogen, oxygen, sulfur, halogen, silicon and phosphorous, a second substituent being an alkyl group including a carbon chain having an unsaturated bond, and a bulky third substituent being at least one selected from the group consisting of alkyl group, an alcoxyl group, a sulfo group, an amino group and a carboxyl group.

3. The dichroic crystal according to claim 1, wherein said phthalocyanine derivative with a central metal introduced therein comprises a benzene ring which includes at least one bulky substituent selected from the group consisting of alkyl group, an alkoxy group, a sulfo group, an amino group and a carboxyl group.

4. The dichroic crystal according to claim 3, wherein said phthalocyanine derivative with a central metal introduced therein is at least one selected from the group consisting of copper (II) tetra-t-butyl phthalocyanine and copper (II) octabutoxy phthalocyanine.

5. The dichroic crystal according to claim 1, wherein said central metal is at least one selected from the group consisting of an alkali metal, an alkaline-earth metal, Al, Si, Ge, Sn, Pb, P, As, Sb, a transition metal, a lanthanide element, an actinide element, Cr—F and Al—Cl.

6. The dichroic crystal according to claim 5, wherein said central metal is coordinated with at least one ligand selected from the group consisting of CN$^-$, O, S, a halide ion and a compound having a lone electron-pair and capable of forming a paired ion.

7. The dichroic crystal according to claim 1, wherein said solution contains a polar donative solvent.

8. The dichroic crystal according to claim 7, wherein said polar donative solvent is at least one selected from the group consisting of dimethylformamide (DMF) and dimethyl sulfoxide (DMSO).

9. The dichroic crystal according to claim 8, wherein said solution contains said polar donative solvent selected from the group consisting of dimethylformamide (DMF) and dimethyl sulfoxide (DMSO), and said phthalocyanine with a central metal introduced therein and said phthalocyanine derivative with a central metal introduced therein includes at least one element selected from the group consisting of Na, Li and Al as the central metal.

10. The dichroic crystal according to claim 8, wherein said solution contains said tetrachloroethane as said polar donative solvent, and at least one member selected, as said phtharocyanine derivative with a central metal introduced therein, from the group consisting of copper (II) tetra-t-butyl phtharocyanine and copper (II) octabutoxy phtharocyanine.

11. The dichroic crystal according to claim 7, wherein said member exhibits a solubility of 1 microgram/milliliter or more to said polar donative solvent.

12. The dichroic crystal according to claim 1 exhibiting scattering peaks of 110 and 170 cm$^{-1}$ in a Raman spectrum when subjected to a Raman scattering spectroscopy.

13. The dichroic crystal according to claim 1 exhibiting an average dichroic ratio of 1.2 or more.

14. The dichroic crystal according to claim 1 formed in at least one form selected from the group consisting of a needle-like configuration and a fibrous configuration.

15. A dichroic single crystal, comprising:

a phthalocyanine derivative having a central metal atom selected from the group consisting of an alkali metal, an alkaline earth metal, Al, Si, Ge, Sn, Pb, P, As, Sb, a transition metal, a lanthanide element, an actinide element, Cr—F and Al—Cl and a benzene ring of the phthalocyanie structure having at least one bulky substituent; and iodine;

said dichroic single crystal being precipitated when said iodine is added to a solution containing said phthalocyanine derivative, said phthalocyanine derivative and said iodine forming a charge transfer complex containing both $I_3^-$ and $I_5^-$ ions;

wherein said charge transfer complex comprises a plurality of columns of parallel laminated molecules of said phthalocyanine derivative, and $I_3^-$ and $I_5^-$ ions being bonded to the columns and having a molecular axis disposed perpendicular to the molecular planes of the phthalocyanine derivative.

* * * * *